United States Patent
Dong (10) Patent No.: US 8,655,168 B2
(45) Date of Patent: Feb. 18, 2014

(54) PASSIVE OPTICAL NETWORK MAINTENANCE METHOD, AN OPTICAL NETWORK UNIT, AND AN OPTICAL LINE TERMINAL

(75) Inventor: Yinghua Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1411 days.

(21) Appl. No.: 11/609,803

(22) Filed: Dec. 12, 2006

(65) Prior Publication Data

US 2007/0147836 A1    Jun. 28, 2007

(30) Foreign Application Priority Data

Dec. 23, 2005  (CN) .......................... 2005 1 0135013
May 18, 2006  (CN) .......................... 2006 1 0078267

(51) Int. Cl.
*H04B 10/08*  (2011.01)
*H04B 17/00*  (2006.01)

(52) U.S. Cl.
USPC ................. 398/22; 398/10; 398/17; 398/99; 398/100

(58) Field of Classification Search
USPC ........... 398/9, 17, 22, 71, 66, 1, 8, 10, 15, 23, 398/25, 38, 39, 70, 100, 35, 36, 24, 98, 99
See application file for complete search history.

(56) References Cited

U.S. PATENT DOCUMENTS 6,108,112 A * 8/2000 Touma ............................ 398/10
6,307,659 B1 * 10/2001 Gilliland et al. ............... 398/135
6,650,839 B1 * 11/2003 Mallard et al. .................... 398/9
7,178,992 B2 * 2/2007 Vafiades et al. ................. 385/88
2004/0156635 A1 * 8/2004 Felske et al. ..................... 398/66
2004/0196862 A1 * 10/2004 Song et al. ..................... 370/442
2005/0129405 A1 * 6/2005 Hubendick .................... 398/100
2006/0051088 A1 * 3/2006 Lee et al. ......................... 398/31
2006/0093356 A1 * 5/2006 Vereen et al. ................... 398/33
2006/0268759 A1 * 11/2006 Emery et al. .................. 370/321

FOREIGN PATENT DOCUMENTS

| CN | 1325204 A | 12/2001 |
| CN | 101317349 B | 7/2011 |
| GB | 2293708 A | 4/1995 |
| JP | 8251102 A | 9/1999 |
| WO | 2006/121523 A2 | 11/2006 |

OTHER PUBLICATIONS

PCT International Search Report; PCT/CN2007/001232; Filing Date: Apr. 16, 2007; 6 pgs.

(Continued)

*Primary Examiner* — Daniel Dobson
(74) *Attorney, Agent, or Firm* — Conley Rose, P.C.; Grant Rodolph; John Scott (57) ABSTRACT

The present disclosure relates to a passive optical network (PON) and provides a method for maintaining the PON, the optical network unit (ONU), and the optical line terminal (OLT) to solve the problem of the ONU being in a constant light emitting state. The method of the present disclosure allows the OLT to determine whether the continuous seizure time of an upstream channel exceeds the preset threshold, and if so, detect the failed ONU that continuously seizes the upstream channel and use a control message or control signal to instruct the failed ONU to turn off power supply to its transmitting circuit.

20 Claims, 5 Drawing Sheets

(56) References Cited

OTHER PUBLICATIONS

PCT Written Opinion; PCT/CN2007/001232; Filing Date: Apr. 16, 2007; 4 pgs.

Foreign communication from a counterpart application—Chinese application 200610078267.8; Office Action dated Jan. 9, 2009, 5 pages.

Foreign communication from a counterpart application—Chinese application 200610078267.8; English translation of Office Action dated Jan. 9, 2009, 4 pages.

Foreign communication from a counterpart application—European application 06026682.2, Office Action dated Nov. 27, 2007; 8 pages.

Foreign communication from a counterpart application—European application 06026682.2, Office Action dated Nov. 30, 2009; 8 pages.

"Draft Amendment to Carrier Sense Multiple Access with Collision Detection (CSMA/CD) Access Method and Physical Layer Specifications," IEEE Draft P802.3ah /D3.3, 2004.

Foreign communication from a counterpart application, Chinese application 200780000412.3, Office Action dated Jul. 2, 2010, 5 pages.

Foreign communication from a counterpart application, Chinese application 200780000412.3, Partial English Translation Office Action dated Jul. 2, 2010, 4 pages.

Foreign communication from a counterpart application, PCT application PCT/CN2007/001232, English Translation Written Opinion dated Jul. 26, 2007, 4 pages.

"Draft Amendment to—Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Media Access Control Parameters, Physical Layers and Management Parameters for Subscriber Access Networks," IEEE Draft P802.3ah/D3.2 (Mar. 22, 2004).

* cited by examiner

PASSIVE OPTICAL NETWORK MAINTENANCE METHOD, AN OPTICAL NETWORK UNIT, AND AN OPTICAL LINE TERMINAL

CROSS-REFERENCE TO RELATED APPLICATIONS

This application is claiming priority of Chinese Application No. 200610078267.8 filed May 18, 2006, entitled "A Passive Optical Network Maintenance Method, an Optical Network Unit, and an Optical Line Terminal", and Chinese Application No. 200510135013.0 filed Dec. 23, 2005, entitled "A Method for Maintaining a Passive Optical Network with a Optical Network Unit and a Optical Line Terminal", both of which are incorporated by reference herein in their entirety.

BACKGROUND

The present disclosure relates to a passive optical network (PON), more particularly to a PON maintenance method, and discloses a method for maintaining the PON, an optical network unit (ONU), and an optical line terminal (OLT).

In the ever growing broadband access networks, most existing local access networks (LANs) run at 100 Megabits per second (Mbps) and many large businesses are transitioning to Gigabit Ethernet (GE). The metropolitan core networks (MCNs) and the metropolitan edge networks (MENs) have abundant synchronous optical network (SONET), synchronous digital hierarchy (SDH), and GE bandwidth capacity, which means that the access network is a serious bandwidth bottleneck. Compared to cable transmission, the optical fiber transmission has a number of advantages including large capacity, low loss, and high immunity to electromagnetic interference. Therefore, fiber access networks are the inevitable development trend as the cost of optical fiber transmission gradually decreases. The last mile access networks require low cost, simple structure, and easy-to-implement capabilities, which is a challenge to achieve technologically. As one of the key fiber access technologies, the passive optical network (PON) implements fiber access to various depths. Based on the depth of the fiber's reach, the fiber access can be divided into fiber to the home (FTTH), fiber to the building (FTTB), fiber to the curb (FTTCurb), fiber to the cabinet (FTTC), and fiber to the premises (FTTP), which are collectively referred to as fiber-to-X (FTTX).

Figure 1:
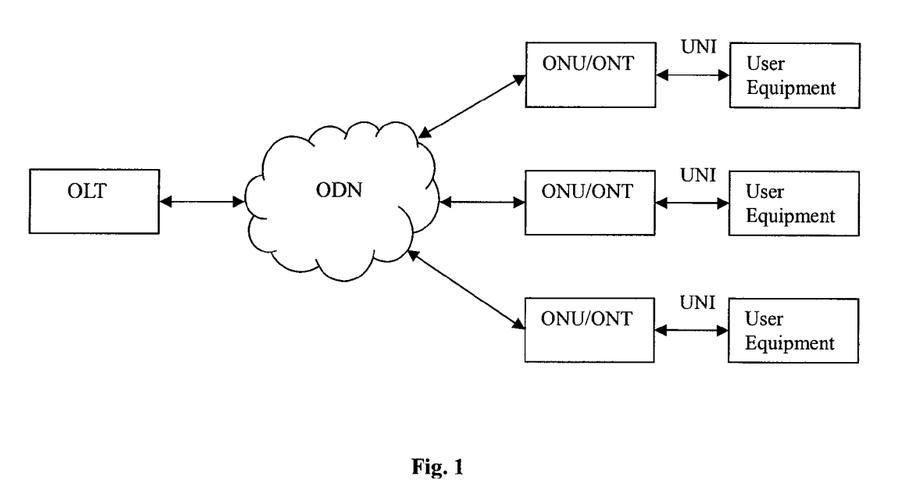
FIG. 1 is a schematic drawing illustrating one embodiment of the PON architecture.

Based on the content it carries, the PON technologies are divided into Asynchronous Transfer Mode Based PONs (APONs), Ethernet Based PONs (EPONs), and Gigabit PONs (GPONs). As shown in FIG. 1, the PON includes an optical line terminal (OLT) residing at the central office and a series of optical network units (ONUs) or optical network terminals (ONTs) residing at the Customer Premises Network. The OLT and the ONU/ONT are connected together by the optical distribution network (ODN), which includes optical fiber, passive optical dividers, and/or optical couplers.

In a PON, a single optical fiber cable can be laid from the service exchange to the broadband service area or office area. The main optical fiber may be divided into a number of branches that go to individual buildings or service terminals using a passive optical divider or coupler. Such an approach will enable multiple users to share the relatively expensive optical link from the exchange to the Customer Premises Network, thus significantly reducing the cost of the FTTB and the FTTH.

There are no active components in the PON from the central exchange to the Customer Premises Network because they are replaced by passive optical components. The point-to-multipoint transmission is achieved by power distribution over the entire path. The replacement eliminates the need for the service provider to maintain and supply power to the active components, thus dramatically cutting the cost to the service provider. The passive optical divider and coupler serve as a light transmitting and limiting means, and do not require a power supply or data processing. The passive optical divider and coupler also have unlimited mean time between failures (MTBF), thus reducing the overall maintenance cost for the service provider.

Figure 2:
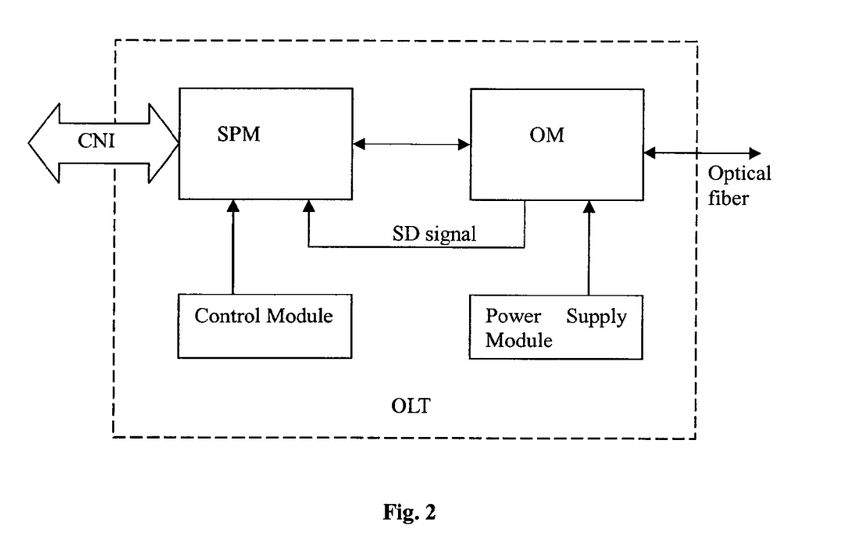
FIG. 2 is a schematic drawing illustrating one embodiment of the OLT architecture.
Figure 3:
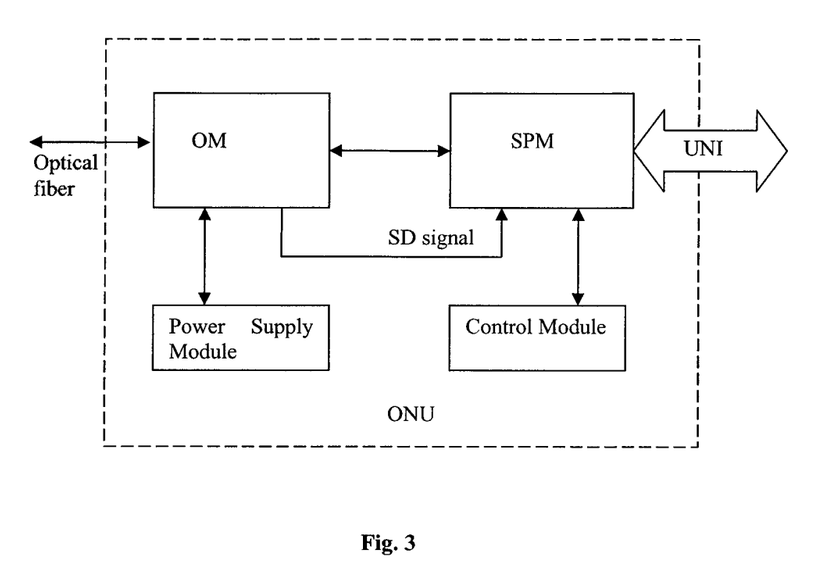
FIG. 3 is a schematic drawing illustrating one embodiment of the ONU architecture.

Through the use of APON, BPON, EPON, or the soon to be standardized GPON technology, the backbone optical fiber cable in the PON can support 155 Mbps, 622 Mbps, 1.25 Gigabits per second (Gbps), or 2.5 Gbps. To support voice, data, and video applications simultaneously, the bandwidth allocated to each user can be static or dynamic.

Where the OLT has a basic architecture as shown in FIG. 2 and the ONU/ONT has a basic architecture as shown in FIG. 3, both the OLT and the ONU/ONT include an optical module (OM) for receiving and/or transmitting optical signals, a service processing module (SPM), and a power supply module. The OM comprises:

a receiving circuit connected to the upstream channel for receiving the upstream channel signal and for optical-electrical conversion;

a transmitting circuit connected to downstream channel for converting a received electrical signal into an optical signal and then sending the optical signal via the downstream channel;

a signal detection (SD) circuit for monitoring whether the upstream channel is continuously seized, e.g. whether there is an incoming optical signal, and outputting the monitoring result via the SD wiring terminal; wherein when there is an incoming optical signal, the SD wiring terminal outputs a high level signal; otherwise, a low level signal is output; and an operation power supply circuit for supplying power to the OM, wherein the power supplied for the transmitting and receiving circuits are combined in the existing technologies.

The SPM end of the OLT connects to the upstream channel network interface at the office end via a central network interface (CNI), and the ONU/ONT end of the OLT connects to the user equipment via a user network interface (UNI). Of course, the basic architecture of the OLT and the ONU/ONT may also include a control module.

The data traffic going downstream in the PON is broadcasted from the OLT to each ONU/ONT, and each ONU/ONT transfers the address information in the cell header through a matching protocol and processes only the data that matches the ONU/ONT's address. The transmission of traffic going upstream is relatively complex. In a point-to-multipoint PON system, due to the medium-sharing characteristic of ODN, all of the ONU/ONT terminals transmit data to the OLT using time division multiple access (TDMA). To avoid conflicts, normally the OLT will allocate different timeslots (authorization) to the registered ONU/ONTs according to the data buffer (to be transmitted) reported by the ONU/ONTs. Each ONU turns on its OM only during its allocated timeslot. Therefore, in normal operations, the upstream channel is used on a timeslot basis, and the SD signal from the OLT's OM is a pulsed signal.

The OLT assigns a timeslot (authorization) to each ONU to ensure that only one ONU is emitting light at a given time, e.g. a particular transmission timeslot represents a particular ONU/ONT so that conflicts between the different ONU/ONT bursts can be avoided by synchronizing these timeslots. However, the OM of a particular ONU/ONT may fail and enter a constant light emitting (CLE) state, or the OM may be set by a malicious user to the CLE state, which can be easily achieved by changing the polarity of the OM transmission enabling pin. When the OM suffers such a failure, then all of the other ONUs that are connected to the same OLT port as the faulty ONU will also fail. Such a result may be unacceptable compared to the traditional point-to-point system.

SUMMARY

The present disclosure provides a method for maintaining a passive optical network (PON), an optical network unit (ONU), and an optical line terminal (OLT) by solving the problem that a failed optical module (OM) cannot be detected and isolated at the OLT side.

A method for maintaining a PON including an OLT and an ONU, wherein the maintenance method includes the following steps:

A. the OLT monitoring the continuous seizure time of the upstream channel;

B. determining whether the continuous seizure time of the upstream channel exceeds the preset threshold and if so, proceeding to step C; otherwise, returning to step A; and C. detecting the failed ONU that continuously seizes the upstream channel and instructing the ONU to turn off the power supply to its transmitting circuit.

In step C, the method for detecting the failed ONU that continuously seizes the upstream channel further includes: first, determining the ONU that continuously seizes the upstream channel for a length of time exceeding the preset threshold, and then determining whether the continuous upstream channel seizure time can be changed by adjusting the ONU compensation delay, and if so, determining that the ONU is normal; otherwise, determining that the ONU has failed.

Step C further includes the following steps:

C1. determining whether only one ONU is registered, and if so, marking the ONU as failed and instructing the failed ONU to turn off the power supply to its transmitting circuit; otherwise, proceeding to step C2;

C2. determining whether all currently connected ONUs are offline, and if so, proceeding to step C3; otherwise confirming that the network is normal; and C3. respectively checking each currently connected ONU, determining the failed ONUs, and instructing all of the failed ONUs to turn off the power supply to their transmitting circuits.

Step C3 further includes the following steps:

C301. broadcasting a control message that gives instructions to turn off the power supply to the transmitting circuit;

C302. determining whether the upstream channel is idle, and if so, skipping to step C304; otherwise continuing to step C303;

C303. sending a pulse signal instruction to each of the currently connected ONUs to instruct them to turn off the power supply to their transmitting circuits;

C304. selecting one ONU to be checked from the currently connected ONUs;

C305. sending a control message to the to-be-checked ONU instructing it to turn on the power supply to its transmitting circuit;

C306. determining whether the continuous seizure time by the to-be-checked ONU exceeds the preset threshold, and if so, proceeding to step C307; otherwise, skipping to step 308;

C307. marking the to-be-checked ONU as failed;

C308. sending a control message to the failed ONU instructing it to turn off the power supply to its transmitting circuit; and C309. determining whether there are any unchecked ONUs, if so, selecting the next ONU to be checked from the unchecked ONUs, and then returning to step C305, and if not, sending a control message to all non-failed ONUs instructing them to turn on the power supply to their transmitting circuits.

Wherein step C306 further includes: if the continuous seizure time of the upstream channel by the to-be-checked ONU exceeds the preset threshold, then determining whether the continuous seizure of the upstream channel can be changed by adjusting the ONU compensation delay, if so, skipping to step C308; otherwise continuing to step C307.

In the above step, the preset threshold refers to the range of timeslots authorized by the OLT to the ONU.

In the PON maintenance method:

the periodic monitoring is achieved by executing step A at predefined interval; or returning to step A from step C2 when confirming that the system is normal, or returning to step A from step C309 after instructing the non-failed ONUs to turn on the power supply to their transmitting circuits such that cyclic monitoring is achieved.

There are operations between steps C305 and C306 including checking whether the to-be-checked ONU is registered or not, and if so, then proceeding to step C306; otherwise going to step C308 after marking the to-be-checked ONU as failed.

In step C303, the OLT causes the OM to output the pulse signal by sending a pulse to the OM to transmit an enable/disable signal.

Wherein the control message is defined by extending the control message, operation, administration, and maintenance (OAM) message predefined in the existing PON, or according to an existing protocol.

Wherein, step C further includes the step of the OLT reporting the information about normal function of the network or about the failed ONU to the maintenance center.

An ONU including an OM that further includes:

a transmitting circuit power supply module connected to the OM for supplying power to the transmitting circuit of the OM; and a transmitting circuit power supply control module connected to the transmitting circuit power supply module for turning on and off the power supply module based on an external power supply control instruction.

The ONU further includes:

a service processing module (SPM), which connects the OM with the power supply control module, for receiving the external power supply control instruction and forwarding it to the transmitting circuit power supply control module; and a receiving circuit power supply module connected to the OM for supplying power to the receiving circuit in the OM.

The SPM includes:

an instruction recognition sub-module for identifying the external power supply control instruction and forwarding it to the power supply control module.

The transmitting circuit power supply control module includes:

an instruction resolution sub-module connected to the instruction recognition sub-module, and for resolving the external power supply control instruction;

an instruction execution sub-module, which connects the instruction resolution sub-module to the receiving circuit power supply module, to generate a corresponding control signal based on the resolution results and output the signal to the transmitting circuit power supply module.

The OM includes a signal detection (SD) wiring terminal for outputting a detection signal to detect whether there is an incoming an optical signal;

the transmitting circuit power supply control module further includes a pulse signal monitoring sub-module, which connects the SD wiring terminal with the instruction execution sub-module. The pulse signal monitoring sub-module instructs the instruction execution sub-module to turn off the transmitting circuit power supply module when the detection signal output from the SD terminal is the predefined pulse signal.

An OLT including an OM, wherein the OLT further includes:

a troubleshooting module connected to the OM for monitoring the fault status indicated by the fact that the continuous seizure time of the upstream channel connected to the OM exceeds the preset threshold, and then locating the fault source and solving the fault.

The troubleshooting module includes:

a fault monitoring sub-module connected to the OM for monitoring the fault status and outputting a fault indication signal;

a fault solving sub-module, which determines the fault source based on the fault indication signal and solves the fault; and a fault information reporting sub-module for reporting the information about the detected fault source to the maintenance center.

The OLT further includes a SPM, which connects the OM with the fault solving sub-module, for receiving the related fault solving instruction generated by the fault solving sub-module and transmitting it via the OM.

The OM includes:

an SD wiring terminal connected the fault monitoring sub-module for outputting a detection signal indicating the arrival of an optical signal; and an enable/disable signal wiring terminal connected to the fault solving sub-module for receiving the pulse enable/disable signals from the fault solving sub-module.

The present disclosure has the following benefits:

The PON maintenance method of the present disclosure allows monitoring of any constant light emitting faults at the optical line unit side as well as detection and maintenance of the failed ONU. The fault monitoring and detection mechanism is simple and reliable in achieving isolation and troubleshooting of the ONU that has a constant light emitting fault.

Furthermore, the method of the present disclosure allows a failed ONU that is unable to get registered to be detected by consulting the registration information, which enhances the reliability and stability of the PON and improves the maintainability of the ONU.

The PON maintenance method of the present disclosure can achieve periodic monitoring at the predefined interval as well as automatic cyclic monitoring to meet the needs of different applications.

To implement the above technical solution, the present disclosure provides an OLT capable of fault detection and troubleshooting as well as the supporting ONU without additional cost.

DETAILED DESCRIPTION

In order to ensure normal operation of the network when one or more of the ONUs or ONTs are in a constant light emitting (CLE) state due to a sudden malfunction, it is necessary to isolate the failed ONU to reduce the impact on the other ONUs.

First, the OLT needs to determine which ONU is in a CLE state, and an embodiment of the present disclosure provides the following fault detection mechanism, which depends on the type of CLE fault that occurs in the OM of the ONU/ONT.

Fault type 1: only one ONU has a failed OM and is in the CLE state, but the ONU can still transmit data correctly.

In this case, because the OLT does not receive any information from the other, normal ONUs for a long time, the OLT thinks the other, normal ONUs are all offline. As such, the other, normal ONUs are unable to be registered, but the ONU in the CLE state can be registered and sends data or control instructions normally. Therefore, the SD signal from the OLT's OM will be constantly high (remain at high level).

Under normal circumstances, if only one ONU is online and the other ONUs are all offline, for example when the users do not turn on their units or there is a power outage, the online ONU intermittently turns on its OM within the timeslot that has been allocated to it by the OLT. In such as case, the SD signal from the OLT's OM should be a pulsed signal.

Because there is only one registered ONT, the other ONTs are all offline, and the SD signal from the OLT's OM is constantly high, the OLT determines that the registered ONT has a failed OM that causes it to be in a constant light emitting state. Because the information sent from this ONU can be received correctly, it can be determined that this ONU is the failed ONU. If this failed ONU is turned off, the other ONUs will be able to work properly.

Fault type 2: only one OM suddenly fails, and the failed OM is in a CLE state. Instead of sending normal data, the failed OM sends hash noise signals.

In this case, all of the ONUs, including the ONU with the failed OM, will go offline and are unable to be registered. It can be determined that the SD signal of the OLT's OM is constantly high (remains at high level).

If this happens, though the OLT can determine that there is a fault, it cannot identify which ONU has failed. To locate the fault, turn off all of the ONUs and turn them back on one by one. If there is one ONU that cannot be registered, then it is that ONU's OM that has failed. Turning off the failed ONU will put the system back into normal operation.

Fault type 3: two or more OMs suddenly fail and are in the CLE state. The data sent from these OMs may be correct data or noise signals.

In this case, the OLT cannot properly receive information from any ONUs, and all of the ONUs, including the ONUs with failed OMs, are offline and cannot be registered. At this time, the SD signal from the OM in the OLT is also constantly high (remains at high level).

Similarly, if this happens, the OLT cannot identify which ONU has failed. To locate the fault, turn off all of the ONUs and then turn them back on one by one. Then check the operation of each ONU. If there is one ONU that cannot be registered or can be registered but its SD signal is constantly high, it can be determined that that ONU has a failed OM. A command can be sent from the OLT to turn off the OM of this ONU. When all of the ONUs are checked, the OLT can turn on all of the normal ONUs to resume normal operation of the system.

In the technical solution of an embodiment of the present disclosure, the OLT controls an ONU by sending a turn-off instruction to the ONU. Although all OMs have turn-on/off control signals, it is likely that a failed OM may not respond to an external control signal. Therefore, the most direct and reliable method is to instruct the failed ONU to turn off the power supply to the OM's transmitting circuit so that the OM will still be able to correctly receive signals. However, if the failed ONU has an OM with a receiving circuit that has also failed, the failed OM will be unable to receive the turn-off instruction from the OLT. To solve this problem, the OLT can consecutively turn on/off its OM several times so that the ONU will receive several continued pulse signals, which are used as an alternative instruction to the instruction to turn off the transmitting circuit power supply.

Figure 4:
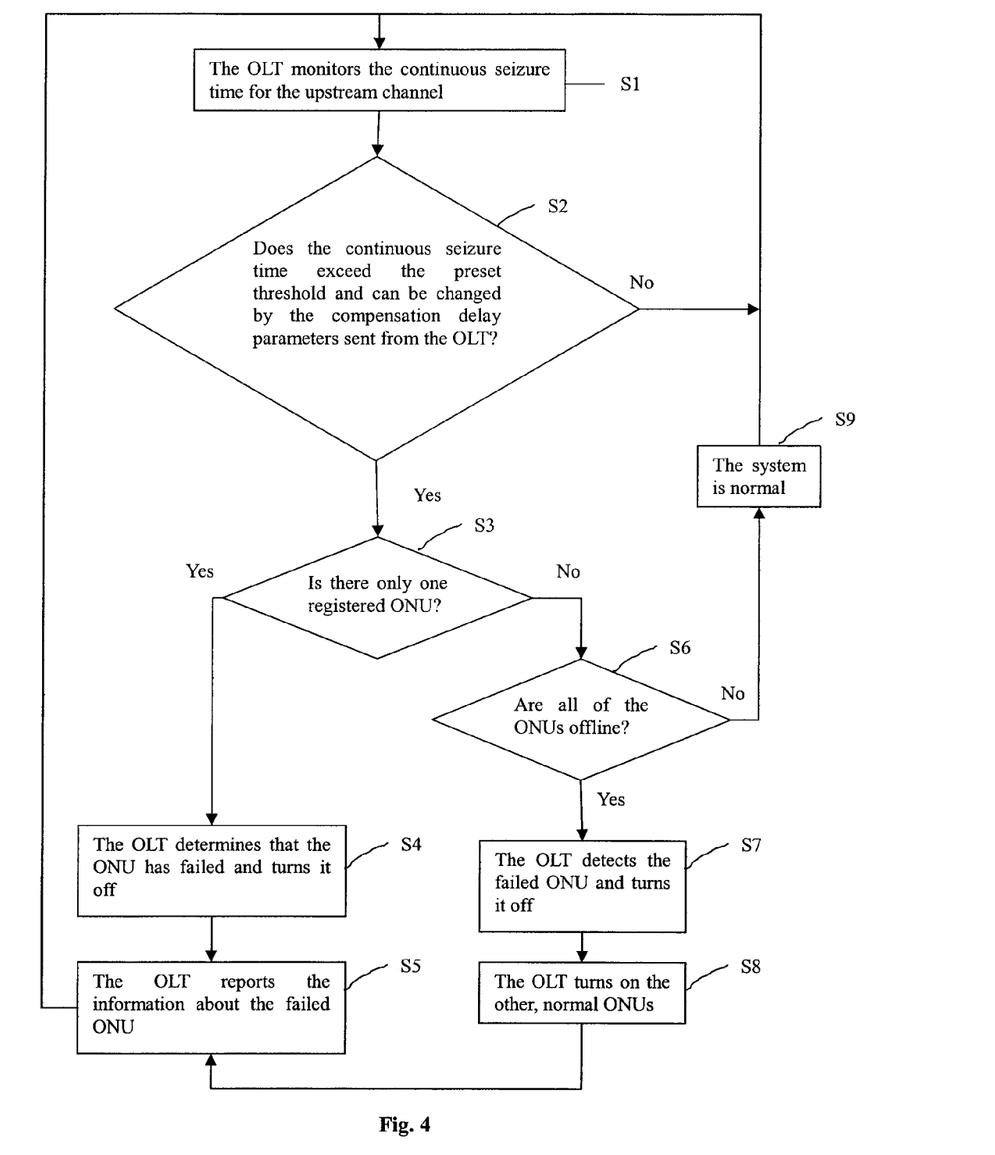
FIGS. 4 and 5 are schematic drawings illustrating embodiments of the flow of detecting and troubleshooting a constant light emitting fault.

In conclusion, the OLT can detect a fault by determining whether the output signal from the SD wiring terminal of the local OM is at a constantly high level. Then, the OLT may send a control instruction to the ONU to locate and resolve the fault. In an embodiment, the maintenance routine may be activated at a preset interval to meet the need for periodic monitoring, or may be activated cyclically to achieve automatic cyclic monitoring. The following is an example of the cyclic monitoring and the maintenance routine, and includes the following steps as shown in FIG. 4:

S1. The OLT monitors the continuous seizure time for the upstream channel.

Usually, the OLT performs such monitoring based on an output signal from the local OM's SD wiring terminal. When there is an incoming optical signal from the upstream channel, the output signal from the SD wiring terminal is at a high level and the continuous seizure time can be obtained by examining the length of time of the high level signal.

S2. The OLT determines whether the continuous seizure time exceeds the preset threshold, and if so, the OLT sends the compensation delay parameters to the ONU based on the preset threshold. If such action cannot change the continuous seizure time, then proceed to the next step of the routine. Otherwise, return to S1 where the preset threshold is the range of timeslots assigned by the OLT to the ONU for sending upstream data.

The compensation delay is the ONU internal delay and is set and controlled by the OLT. This parameter is designed to delay the upstream transmission so that the upstream data sent from the ONU arrives at the OLT in the same phase. The arrival time of data transmitted from the ONU may drift due to aging or temperature change. By adjusting the compensation delay, the problem of drift can be solved. However, adjustment of the compensation delay is ineffective at correcting a failed ONU in the CLE state.

Of course, the OLT can also proceed to the next step of the routine without sending the compensation delay parameters to the ONU, and is still able to locate and solve the ONU fault.

S3. The OLT determines whether there is only one registered ONU, and if so, proceeds to the next step; otherwise, the routine skips to S6.

S4. The OLT determines that the current registered ONU has failed, and sends a turn-off instruction to the ONU.

Once the turn-off instruction has been sent, the OLT checks whether the upstream channel is idle, and if so, the ONU's receiving circuit is normal and correctly executes the turn-off instruction. Otherwise, the ONU's receiving circuit has also failed and is unable to execute the turn-off instruction correctly. Then, the OLT may instruct the OM to consecutively turn on and off several times to send a pulse instruction to the ONU. When the ONU receives the pulse signal and a corresponding pulse detection signal is output from the SD terminal, the control device in the ONU will turn off the OM as instructed by this pulse signal.

S5. The OLT reports the information about the failed ONU to the maintenance center and then returns to step S1. This concludes the periodic monitoring until the next periodic monitoring starts.

S6. The OLT determines whether all of the ONUs are offline, e.g. whether there are not any registered ONUs, and if so, proceeds to the next step; otherwise, the routine skips to S9.

S7. The OLT detects and turns off the failed ONU.

S8. The OLT turns on the normal ONUs before returning to S5.

S9. The system resumes its normal operation, reports to the maintenance center, and then returns to S1. This concludes the periodic monitoring until the next periodic monitoring starts.

Figure 5:
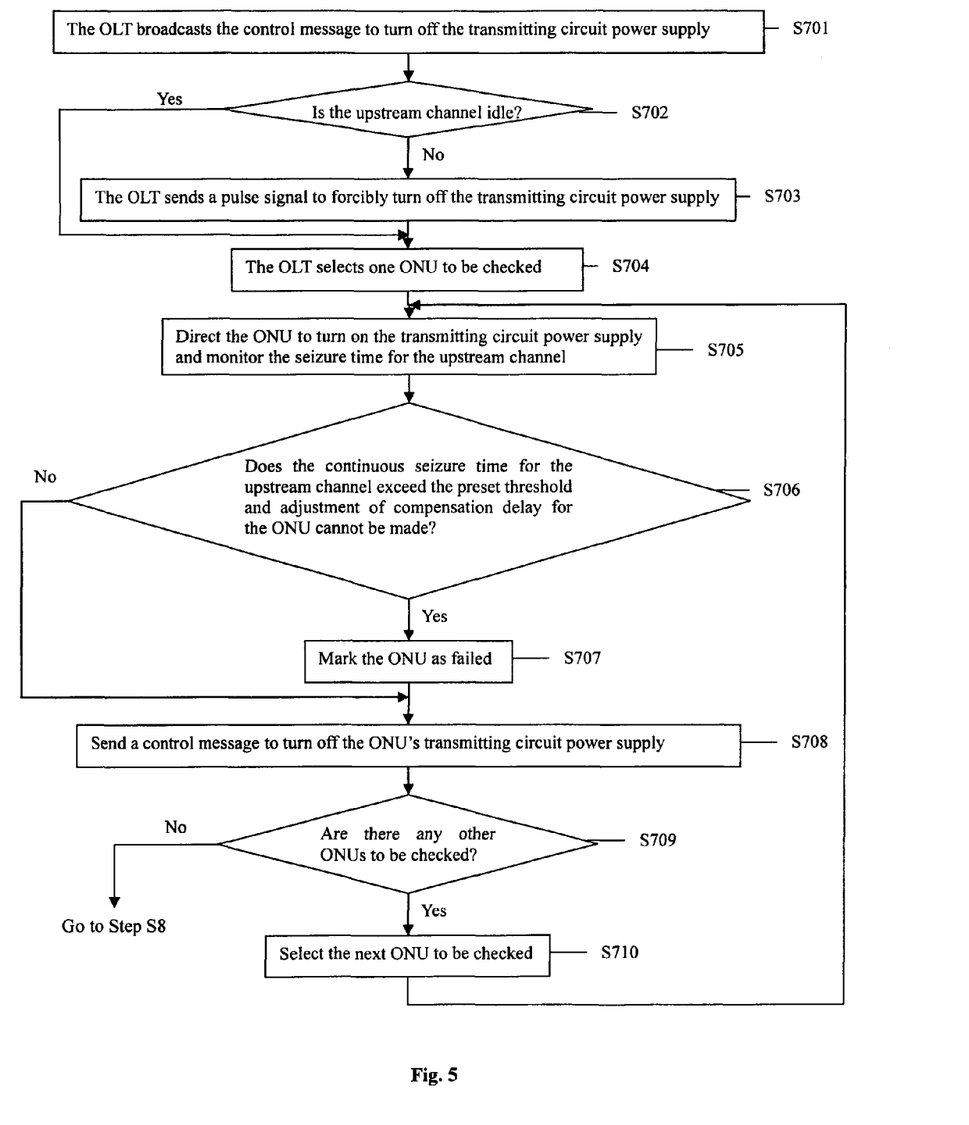

In the above step S7, the OLT detects and turns off all failed ONUs through the following steps, as shown in FIG. 5:

S701. The OLT broadcasts a control message to all of the ONUs to instruct them to turn off the power supply to their transmitting circuits;

S702. The OLT determines whether the upstream channel is idle and if so, skips to step S704; otherwise the routine proceeds to step S703;

S703. The OLT sends a pulse signal to all currently connected ONUs forcing them to turn off the power supply to their transmitting circuits.

If the receiving circuits of all of the ONUs operate normally, the instruction to turn-off the power supply can be executed correctly, and the upstream channel is idle. If there is an ONU that has a failed receiving circuit, then the ONU may be turned off with a forcible turn-off instruction.

The OLT can instruct the OM to output a pulse signal by converting the transmit enable signal from the OM into a pulse enable signal.

In actual operation, step S702 can be repeated after step S703 to double check whether the upstream channel is idle.

S704. The OLT obtains information about all currently connected ONUs and selects an ONU to be checked.

S705. The OLT sends the turn-on power instruction to the ONU to be checked, and monitors the time that the ONU continuously seizes the upstream channel.

S706. The OLT monitors whether the continuous seizure time by the ONU on the upstream channel exceeds the preset threshold, and if so, adjusts the ONU compensation delay to determine whether the adjustment changes the continuous seizure time, and if so, skips to step S708; otherwise it is determined that the continuous seizure is a constant light emitting fault.

If the ONU operates properly, the power supply to its transmitting circuit will be turned on. The ONU will then properly register and seize the upstream channel using the allocated timeslot. If the ONU has failed, it will continuously seize the upstream channel when the power supply to its transmitting circuit is turned on. Therefore, by the ONU examining the continuous upstream channel seizure time or by further performing the compensation delay adjustment, it can be determined whether the ONU has failed. It should be noted that if the upstream channel seizure time by the ONU is zero even though the ONU is unable to be registered, the ONU will have an impact on the upstream channel and this is not the CLE fault described herein.

The upstream channel seizure time is monitored by examining the length of time of the high level signal output from the OM's SD terminal. The preset time threshold is equal to the allocated timeslot by the OLT to each ONU. If the ONU to be checked seizes the upstream channel within the allocated timeslot, the ONU will automatically turn off at the end of the timeslot, and its upstream channel continuous seizure time is less than the preset time threshold. If the ONU continuously seizes the upstream channel after the power supply to its transmitting circuit is turned on, and the seizure time exceeds the preset time threshold, it can be determined that the ONU's transmitting circuit has failed.

S707. The OLT marks the ONU as failed.

S708. The OLT sends an instruction to the ONU instructing it to turn off the power supply to its transmitting circuit.

In the course of checking, the transmitting circuit's power supply for the normal ONUs may also be turned off.

S709. The OLT determines whether all of the ONUs to be checked have been checked, and if so, goes to S8; otherwise, the routine proceeds to the next step.

S710. The OLT selects the next ONU to be checked from the unchecked ONUs and returns to step S705.

Through the above cyclic checking, the OLT will identify all failed ONUs, including the ONUs that have a failed transmitting circuit but a normal receiving circuit, and the ONUs that have a transmitting circuit and receiving circuit that are both failed.

During the above checking, the OLT records and reports the information about any failed ONUs, turns off all failed ONUs and turns on all normal ONUs so that the PON resumes its normal operation.

In the above checking and maintenance process, the CLE fault in any of the ONUs is solved. To identify an ONU that is unable to be registered, the user may add a step between step S705 and S706 described herein, that is, the step of consulting the registration information to determine whether the ONU is registered. If the ONU is registered, then proceed to S706 to monitor the upstream channel seizure time; otherwise, mark this ONU as failed and go to S708. If the ONU is not registered, this means that the transmitting circuit of the ONU has completely failed completely and is unable to send either a correct signal or a noise signal. Even though the ONU has no impact on the use of the upstream channel, it is still necessary to record the failed ONU and report it to the maintenance center.

Figure 6:
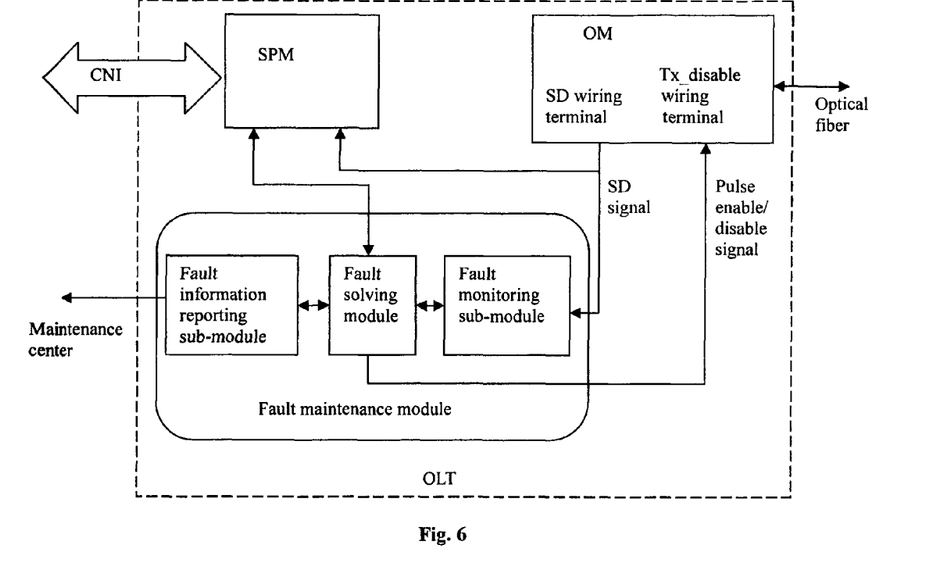
FIG. 6 is a schematic drawing illustrating another embodiment of the architecture of the OLT.

As shown in FIG. 6, another embodiment of the present disclosure provides an OLT architecture including an OM, a power supply module, and an SPM for implementing the above technical solution and further including:

a troubleshooting module connected to the OM for monitoring the fault status indicated by the fact that the continuous seizure time of the upstream channel connected to the OM exceeds the preset threshold as well as locating the fault source and solving the fault.

The troubleshooting module may further include:

a fault monitoring sub-module connected to the OM for monitoring the fault status and outputting a fault indication signal;

a fault solving sub-module that determines the fault source based on the fault indication signal and solves the fault;

a fault information reporting sub-module for reporting the information about the detected fault source to the maintenance center.

The SPM connects the OM to the fault solving sub-module, for receiving the related fault solving instruction generated by the fault solving sub-module and transmitting it via the OM.

The OM includes an SD wiring terminal for outputting the detection signal indicating whether there is an incoming optical signal. The fault monitoring sub-module connects to this SD wiring terminal and monitors the fault status based on a signal output from this SD wiring terminal.

The fault solving sub-module also connects to the transmit enable signal (transmit enable/disable) receiving side of the OM so that the fault solving sub-module can instruct the OM to output a pulse signal by inputting a pulse enable signal to the transmit enable signal (transmit enable/disable) receiving side of the OM.

The troubleshooting module can be a standalone unit or be combined with the existing control module.

Figure 7:
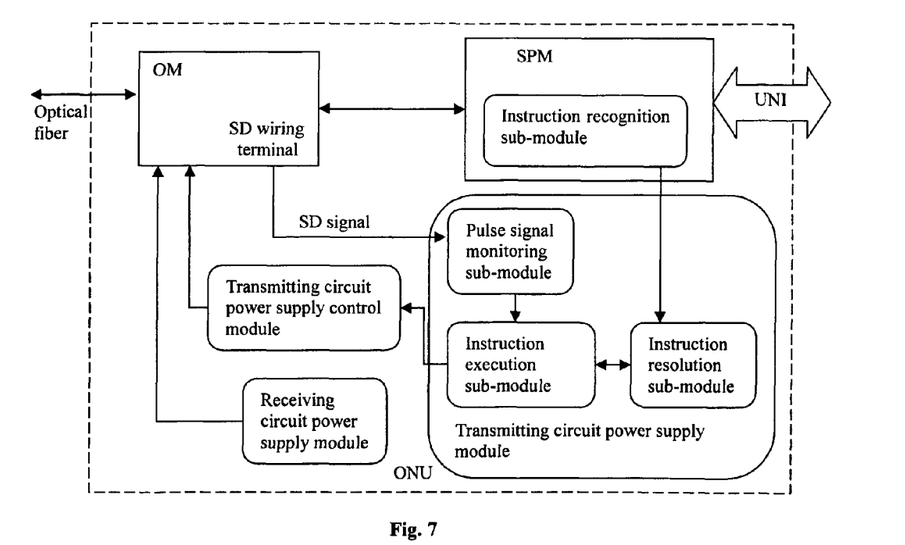
FIG. 7 is a schematic drawing illustrating another embodiment of the architecture of the ONU.

As shown in FIG. 7, yet another embodiment of the present disclosure provides an ONU architecture including an OM, a power supply module, and an SPM to support the OLT of the present disclosure, which may further include:

a transmitting circuit power supply module connected to the OM for supplying power to the OM's transmitting circuit;

a transmitting circuit power supply control module connected to the transmitting circuit power supply module for turning on/off the power supply module based on an external power supply control instruction;

a receiving circuit power supply module connected to the OM for supplying power to the OM's receiving circuit; and a service processing module (SPM), which connects the OM to the power supply control module, for receiving the external power supply control instruction and forwarding external power supply control instructions to the transmitting circuit power supply control module.

The SPM includes an instruction recognition sub-module for identifying the external power supply control instruction and forwarding external power supply control instructions to the power supply control module.

The transmitting circuit power supply control module may include:

an instruction resolution sub-module connected to the instruction recognition sub-module for resolving the external power supply control instruction; and an instruction execution sub-module, which connects the instruction resolution sub-module with the transmitting circuit power supply module to generate a corresponding control signal based on the resolution results and output the signal to the transmitting circuit power supply module.

The OM includes a SD wiring terminal for outputting a detection signal to indicate whether there is an incoming optical signal. The transmitting circuit power supply control module further includes a pulse signal monitoring sub-module, which connects the SD wiring terminal with the instruction execution sub-module, and instructs the instruction execution sub-module to turn off the transmitting circuit power supply module when the detected signal of the signal output from the SD terminal is a predefined pulse signal.

In the above ONU, the power supply to the OM's transmitting and receiving circuits are separately provided and the transmitting circuit power supply can be turned on or off by the control module. In case of a fault, the OLT can send an instruction to one ONU or all of the ONUs instructing them to turn off their OMs, and the control module of these ONUs will turn off the power supply to the OMs' transmitting circuit upon receiving the instruction. The turn-off instruction message may be built by extending an existing control message, an operation, administration, and maintenance (OAM) message, or may be specifically defined according to the existing protocol. Such extensions and definitions are known to those skilled in the art and needs not to be further described herein.

The transmitting circuit power supply control module can be a standalone unit or combined with the existing control module in the OLT.

Through use of the OLT and ONU described herein, a fault maintenance system can be established in the PON, which can detect and solve a CLE fault in the PON.

The technical solution of the embodiments of the present disclosure is easy to implement, and the detection mechanism in the OLT is also simple. At the ONU, all that is required is to separate the OM's power supply circuits and provide a means of turn-on/off control for the transmitting circuit power supply. Compared with the existing PON systems, the PON system of the present disclosure allows detection and isolation of any failed ONU without additional cost, thereby greatly improving the reliability and stability of the PON system as well as the maintainability of the ONU terminals.

It will be apparent to those skilled in the art that changes or variations to the present disclosure can be made without departing from the spirit and scope thereof. Therefore, if the changes and variations to present disclosure are subject to the claims of present disclosure and their equivalent technical scope, then the intent of present disclosure also includes these changes and variations.

What is claimed is:

1. A network component comprising:
    a processor configured to:
    monitor a continuous seizure time for an upstream channel in a passive optical network (PON) comprising a plurality of optical network units (ONUs), wherein the continuous seizure time is obtained by examining the length of time a signal detection circuit detects a signal is present on the upstream channel;
    determine whether the continuous seizure time exceeds a predetermined threshold; and
    if the continuous seizure time exceeds the predetermined threshold, detect a failed ONU and disable a transmitter in the failed ONU,
    wherein the network component is an optical line terminal (OLT), and
    wherein a light emitted by the failed ONU during other ONUs' timeslots has a constant intensity and a constant wavelength.

2. The component of claim 1 wherein detecting the failed ONU comprises:
    determining whether one of the ONUs has a seizure time exceeding the predetermined threshold;
    determining whether the seizure time can be changed by adjusting a compensation delay in the failed ONU if the seizure time exceeds the predetermined threshold; and
    determining that the ONU is the failed ONU if the seizure time cannot be changed by adjusting the compensation delay.

3. The component of claim 1, wherein the processor is further configured to report a status of the PON to a maintenance center.

4. The component of claim 1, wherein the failed ONU is associated with an upstream timeslot, and wherein the failed ONU transmits data during the upstream timeslot and transmits a constant light during at least part of the time outside of the upstream timeslot.

5. The component of claim 1, wherein the failed ONU transmits noise.

6. The component of claim 1, wherein a plurality of the ONUs have failed.

7. The component of claim 1, wherein the failure in the failed ONU is caused by a change in temperature of the failed ONU.

8. The component of claim 1, wherein the failure in the failed ONU is not a constant light emitting state.

9. The component of claim 1, wherein detecting the failed ONU and disabling the transmitter in the failed ONU comprises:
    determining whether there is only one registered ONU;
    if there is only one registered ONU, determining that the registered ONU is the failed ONU and disabling the transmitter in the failed ONU;
    determining whether the ONUs are offline if there is more than one registered ONU; and
    if the ONUs are offline, checking each ONU, detecting the failed ONU, and disabling the transmitter in the failed ONU.

10. The component of claim 9, wherein checking each ONU, detecting the failed ONU, and disabling the transmitter in the failed ONU comprises:
    broadcasting a message instructing each ONU to disable their transmitter;
    determining whether the upstream channel is idle;
    if the upstream channel is not idle, sending a pulse signal to the failed ONU, thereby disabling the transmitter in the failed ONU;
    selecting one of the ONUs;
    sending a control message to the selected ONU providing instructions to enable the transmitter in the selected ONU;
    determining whether the seizure time by the selected ONU exceeds the predetermined threshold;
    determining that the selected ONU is the failed ONU if the seizure time by the selected ONU exceeds the predetermined threshold;
    sending a control message to the failed ONU instructing the failed ONU to disable the failed ONU's transmitter power supply; and
    sending a control message to the non-failed ONUs instructing the non-failed ONUs to enable their transmitters.

11. The component of claim 10, wherein the continuous seizure time is monitored periodically at a predefined interval.

12. The component of claim 10, wherein the processor is further configured to:
    determine whether the selected ONU is registered; and
    determine that the selected ONU is the failed ONU if the selected ONU is not registered.

13. The component of claim 10, wherein an optical module (OM) outputs the pulse signal.

14. The component of claim 10, wherein the control message is an operation, administration, and maintenance (OAM) message, an extension of an OAM message, predefined in the PON, or defined according to an existing protocol.

15. The component of claim 10, wherein determining whether the seizure time by the selected ONU exceeds the predetermined threshold comprises determining whether the seizure time can be changed by adjusting a compensation delay in the ONU.

16. The component of claim 15, wherein the predetermined threshold is a range of upstream channel timeslots assigned to the ONU.

17. An optical line terminal (OLT) comprising:
    an optical module (OM); and a troubleshooting module coupled to the OM, wherein the troubleshooting module is configured to;
    monitor a fault status indicated by a continuous seizure time of an upstream channel obtained by examining the length of time a signal detection circuit detects a signal is present on the upstream channel;
    determine whether the continuous seizure time exceeds a predetermined threshold;
    locate a faulty optical network unit (ONU); and
    solve a fault, wherein the faulty ONU transmits only noise.

18. The OLT of claim 17, wherein the troubleshooting module comprises:
    a fault monitoring sub-module coupled to the OM, wherein the fault monitoring sub-module is configured to monitor the fault status and output a fault indication signal;
    a fault solving sub-module configured to determine the faulty ONU using the fault indication signal and solve the fault; and
    a fault information reporting sub-module configured to report the information about the faulty ONU to a maintenance center.

19. The OLT of claim 18 further comprising a service processing module (SPM) coupled to the OM and the fault solving sub-module, wherein the SPM is configured to receive the related fault solving instruction generated by the fault solving sub-module and transmit the instruction via the OM.

20. The OLT of claim 18, wherein the OM comprises:
    a signal detection (SD) wiring terminal coupled to the fault monitoring sub-module, wherein the SD wiring terminal is configured to output a detection signal indicating the arrival of an optical signal; and
    a disabling signal terminal coupled to the fault solving sub-module, wherein the disabling signal terminal is configured to receive a pulse disabling signal from the fault solving sub-module.

* * * * *